United States Patent
VanBlon et al.

(10) Patent No.: US 9,870,188 B2
(45) Date of Patent: Jan. 16, 2018

(54) CONTENT VISIBILITY MANAGEMENT

(71) Applicant: Lenovo (Singapore) Pte. Ltd., Singapore (SG)

(72) Inventors: Russell Speight VanBlon, Raleigh, NC (US); John Carl Mese, Cary, NC (US); Arnold S. Weksler, Raleigh, NC (US); Nathan J. Peterson, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 136 days.

(21) Appl. No.: 14/461,707

(22) Filed: Aug. 18, 2014

(65) Prior Publication Data

US 2016/0048364 A1    Feb. 18, 2016

(51) Int. Cl.
*G06F 9/44* (2006.01)
*G06F 3/0481* (2013.01)
*G06F 3/14* (2006.01)
*G06F 3/01* (2006.01)
*G09G 5/00* (2006.01)
*G09G 5/14* (2006.01)

(52) U.S. Cl.
CPC ............ *G06F 3/1423* (2013.01); *G06F 3/013* (2013.01); *G06F 9/4443* (2013.01); *G09G 5/006* (2013.01); *G09G 5/14* (2013.01); *G06F 3/0481* (2013.01); *G06F 2203/04803* (2013.01); *G09G 2340/10* (2013.01); *G09G 2340/14* (2013.01); *G09G 2370/12* (2013.01)

(58) Field of Classification Search
None
See application file for complete search history.

(56) References Cited

U.S. PATENT DOCUMENTS

| | | | | |
|---|---|---|---|---|
| 5,047,760 | A | * | 9/1991 | Trevett .................... G09G 5/39 345/548 |
| 5,390,295 | A | * | 2/1995 | Bates .................... G06F 3/0481 714/E11.188 |
| 5,712,995 | A | * | 1/1998 | Cohn .................... G06F 3/0481 715/792 |
| 5,796,402 | A | * | 8/1998 | Ellison-Taylor ......... G09G 5/14 715/792 |
| 6,008,809 | A | * | 12/1999 | Brooks ................. G06F 3/0481 715/792 |
| 2005/0149879 | A1 | * | 7/2005 | Jobs ...................... G06F 3/0481 715/796 |
| 2006/0161868 | A1 | * | 7/2006 | Van Dok ............... G06F 3/0481 715/835 |
| 2007/0101289 | A1 | * | 5/2007 | Awada .................. G06F 3/0481 715/784 |
| 2007/0288863 | A1 | * | 12/2007 | Ording .................. G06F 3/0481 715/788 |

(Continued)

*Primary Examiner* — Antonio Xavier
(74) *Attorney, Agent, or Firm* — Ference & Associates LLC

(57) ABSTRACT

One embodiment provides a method, including: outputting, to a display device, first content; receiving, using a processor, an instruction to output second content to the display device; positioning one or more of the first content and the second content within the display device according to positioning data based on the first content; and displaying both of the first content and the second content on the display device. Other embodiments are described and claimed herein.

18 Claims, 3 Drawing Sheets

(56) References Cited

U.S. PATENT DOCUMENTS

| | | | |
|---|---|---|---|
| 2008/0034317 A1* | 2/2008 | Fard | G06F 3/0481 |
| | | | 715/781 |
| 2008/0163104 A1* | 7/2008 | Haug | G06F 3/0481 |
| | | | 715/788 |
| 2009/0141895 A1* | 6/2009 | Anderson | G06F 21/84 |
| | | | 380/252 |
| 2009/0235202 A1* | 9/2009 | Sims | G06F 3/0481 |
| | | | 715/789 |
| 2010/0011316 A1* | 1/2010 | Sar | G06F 9/4443 |
| | | | 715/784 |
| 2010/0313164 A1* | 12/2010 | Louch | G06F 3/0481 |
| | | | 715/790 |
| 2011/0175930 A1* | 7/2011 | Hwang | G06F 3/0481 |
| | | | 345/629 |
| 2013/0246926 A1* | 9/2013 | Vemireddy | G06F 17/30867 |
| | | | 715/738 |
| 2013/0305184 A1* | 11/2013 | Kim | G06F 3/0481 |
| | | | 715/781 |
| 2014/0115531 A1* | 4/2014 | Zhang | G06T 15/503 |
| | | | 715/790 |
| 2014/0282229 A1* | 9/2014 | Laukkanen | G06F 3/0481 |
| | | | 715/788 |

* cited by examiner

CONTENT VISIBILITY MANAGEMENT

BACKGROUND

Electronic devices (e.g., desktop computers, laptop computers, smart phones, tablets, e-readers, etc.) display content of applications on a display device. In an operating system that supports simultaneously content or window type viewing, as for example typically found in a Microsoft WINDOWS operating system, content often is overlaid. That is, content from a first window of an application may overlap that of another application window.

Typically, the content display area chosen (window location area in the display device) is that of the last similar window location. For example, if a user is displaying content of Microsoft WORD document processing application, and chooses to open a calculator application, the calculator application is displayed in the area of the display device where the calculator application was last displayed.

This positioning may be modified in some cases. For example, a user might open two windows in a split screen mode. This divides the content display areas into predetermined frames, e.g., side by side viewing areas. However, the user must choose this mode of display in order to have it applied. Thus, display content tends to overlap or otherwise not be organized intelligently as a default setting in conventional systems.

BRIEF SUMMARY

In summary, one aspect provides a method, comprising: outputting, to a display device, first content; receiving, using a processor, an instruction to output second content to the display device; positioning one or more of the first content and the second content within the display device according to positioning data based on the first content; and displaying both of the first content and the second content on the display device.

A further aspect provides an apparatus, comprising: a display device; an input device; a processor; and a memory that stores instructions executable by the processor to: output, to the display device, first content; receive an instruction to output second content to the display device; position one or more of the first content and the second content within the display device according to positioning data based on the first content; and display both of the first content and the second content on the display device.

Another aspect provides a product, comprising: a computer readable storage device having code embodied therewith, the code being executable by a processor and comprising: code that outputs, to a display device, first content; code that receives, using a processor, an instruction to output second content to the display device; code that positions one or more of the first content and the second content within the display device according to positioning data based on the first content; and code that displays both of the first content and the second content on the display device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
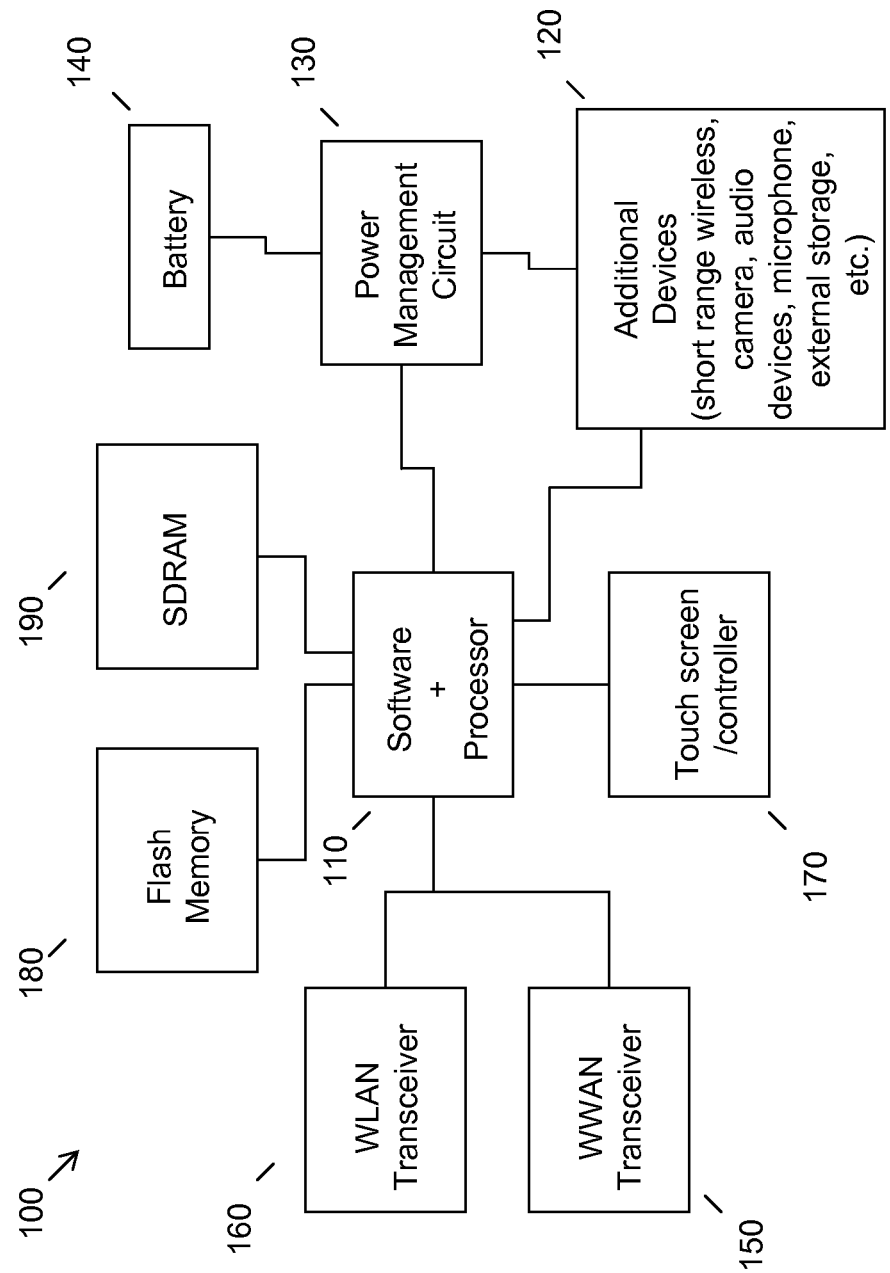
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When opening an application in a multi-window environment, newly opened content often appears on top of other content that a user might need to see. For example, if the user is typing/reading an email and needs to open a calculator to calculate something, the calculator window might open on top of the email window, requiring the user to move one of the windows to view all content at the same time. Currently, windows or displays of content will open in the same location the user last moved them to as a default setting. This means that the user is required to manually provide inputs for moving the content when inconvenient overlaps occur.

Accordingly, an embodiment determines if content being activated or launched for display is associated with already displayed content (e.g., content from correlated application(s) that are currently displayed). If an association exists and is determinable, the display areas within the display device chosen for the content may be intelligently sized/positioned so that the all the content (or important sub-parts of the content) are viewable on the display device at the same time. For example, this may include moving one or more of the windows, opening application(s) or views in split view, making certain content transparent, etc.

Associations between content may be determined in a variety of ways. For example, content may be associated in time, where recently used applications are correlated. By way of example an embodiment may use eye tracking to determine which application(s) the user was last using, or used recently, and thus determine that these applications should not overlay one another on the display. For example, using eye tracking data an embodiment may determine that currently or recently viewed applications and newly launched content belong to or originate from correlated applications.

Associations or correlations may be made in other ways. For example, an embodiment may determine that a user often views two or more applications (and their content) simultaneously, perhaps switching between windows thereof. An embodiment may track this behavior (or pre-store certain associations) to determine that content of these applications should not be overlaid but rather viewed side by side or in a non-obstructive manner. Thus, an embodiment may determine when an application is launched and/or activated that a correlation between applications that are active exist to ensure the applications that are associated are simultaneously visible.

In addition to a recent use of an application or frequent, concurrent use of applications, the time spent in an application may inform a determination that content is associated or correlated. For example, a content type (e.g., content type A) might be viewed for an extended period of time. Following launch of a new type of content, e.g., of content type B, an embodiment may determine that content A is of prime importance and should not be overlaid by content B. Thus, content may be correlated or associated simply be determining a particular part of the display is important.

Similarly, the type of content (e.g., content type of a particular application) being viewed may inform a determination that currently displayed content is correlated to newly displayed content. For example, content types such as text or images of an application might inform the determination that a particular content type should not be overlaid. By way of example, in a web browsing context, a content type such as text may be important (e.g., as informed by eye tracking data or as a predetermined rule), whereas image content of an advertisement might not be. Thus, content launched may be positioned over image content of advertisements rather than over the text of currently viewed content.

Therefore, content within an application may be processed to determine if it is important or if it likely correlates to another application's content. An embodiment might process certain content (or metadata associated therewith) to determine a content type or document element is associated with a newly launched application or its content. In such a manner, a part of the existing display containing the content type may be reserved and the new content displayed elsewhere.

An embodiment attempts to ensure to the extent possible that displaying additional content (e.g., opening another application) does not overlay or is not displayed on top of another area of content the user was just viewing. The end result is to find an unobtrusive location on the display device to place the new content. This may involve positioning (including resizing) of one or more of the windows or views to make important information visible to the user.

If moving/resizing windows cannot fit all associated content on a given display device, e.g., with a given size or resolution, one or more of the windows may be changed to be drawn transparently in order to achieve a partial viewing effect. Likewise, some overlap may be made and only important sub parts of the display area might be reserved to avoid overlap therewith. For example, eye tracking data may inform an embodiment of a sub part of a display device that should not be overlaid. Likewise, other user derived data may be used, e.g., keyboard input into fields, touch input, etc. Similarly, underlying content data, e.g., text input fields, actionable elements such as links in a browser, etc., might be reserved for non-overlap or transparent display.

An embodiment works across multiple monitors, i.e., in a multiple display device system. A window or view animation may be used to indicate to the user where the window or view is going or went to (i.e., where in the display device(s) it is opened) in case the user last saw it in another position. For example, the animation may be located at the expected window position or the destination window position (or both).

A queue of recently used applications may be maintained to be later processed when another application is opened in order to determine applications and/or their content are associated. Multiple histories may also be maintained to draw frequency based associations or correlations. Moreover, correlations may be stored remotely (e.g., on a cloud device) and shared across devices so that future correlation learning is shortened for first-time use on a given device.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms.

Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120), for example a keyboard, camera, microphone, and the like, may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., such as a camera, microphone, audio output device, or other input/output devices. System 100 often includes a touch screen 170 for data input and display/rendering. System 100 also typically includes various memory devices, for example flash memory 180 and SDRAM 190.

Figure 2:
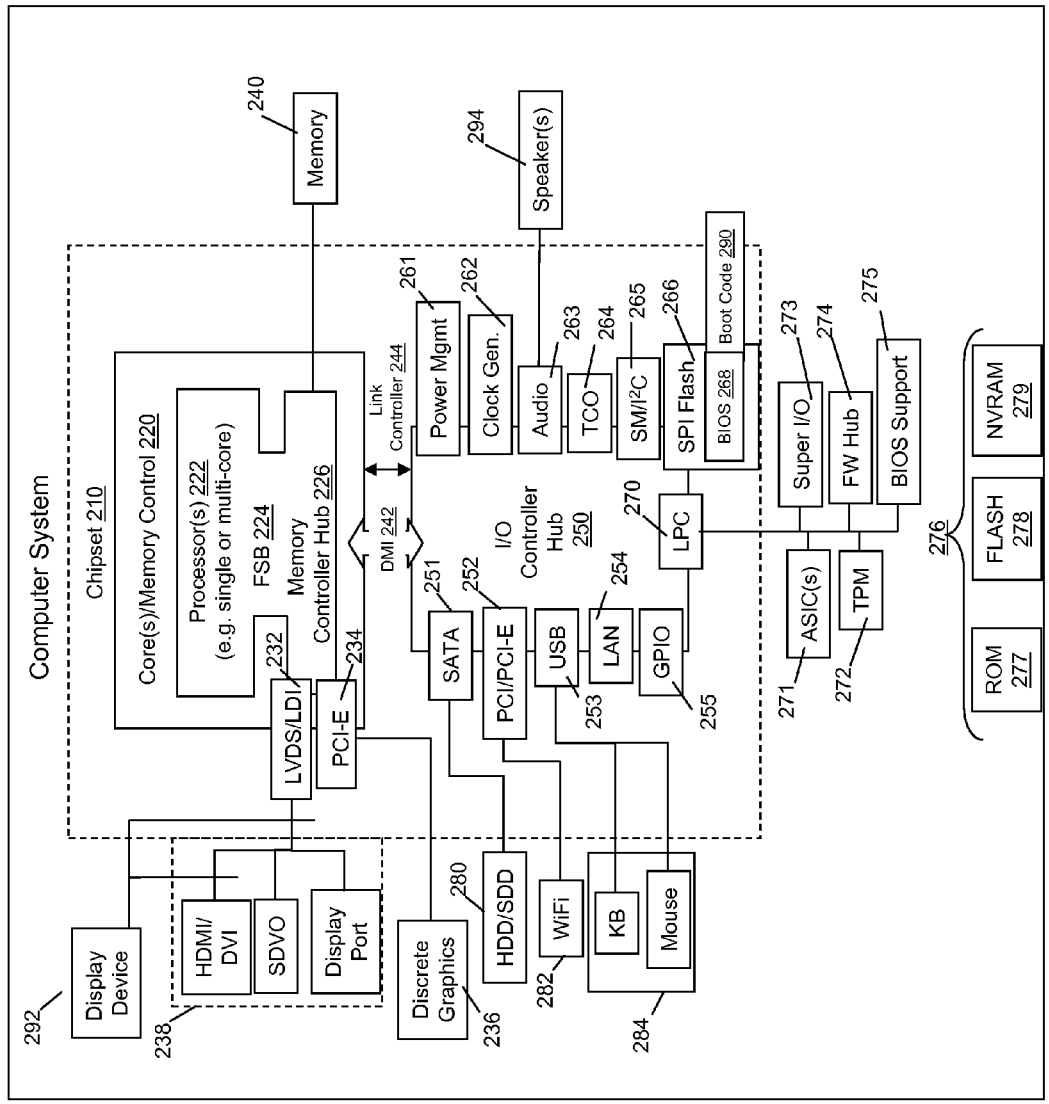
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a flat panel display, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mouse, camera, phone, microphone, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices that provide multi-window viewing. For example, the circuitry outlined in FIG. 1 may include a touch screen and controller 170 that displays data from multiple applications in an overlapping view. Likewise, the circuitry of FIG. 2 may include an operatively coupled display device 292 that displays multiple windows simultaneously.

Figure 3:
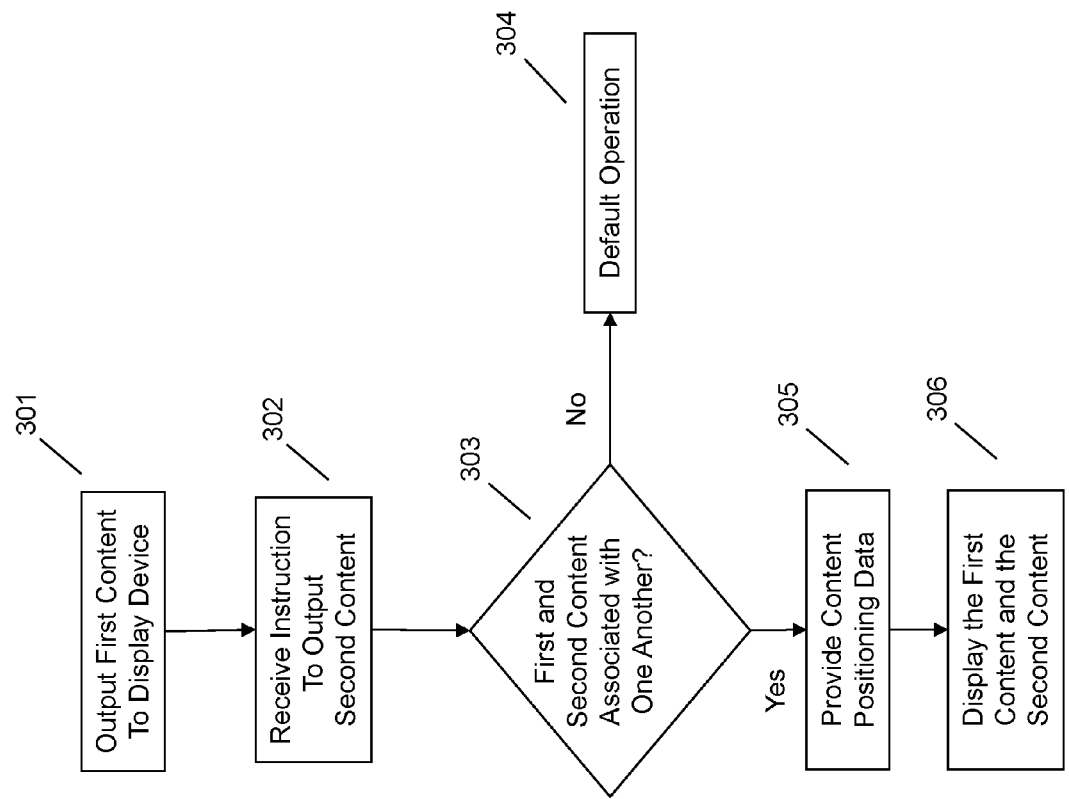
FIG. 3 illustrates an example method of content visibility management.

According to an embodiment, as outlined in the example of FIG. 3, when providing multiple window viewing, a processor of a device, e.g., a laptop computer, tablet device, smart phone, etc., outputs to a display device a first content at 301. This may occur for example when a user is viewing an email application, e.g., displayed on display device 292.

Thereafter, an instruction is received, e.g., by a processor of a device, to output second content to the display device at 302. As may be appreciated, this new content may be any of a variety of content, depending on the type of applications supported by a particular device. By way of example, if the first content is an email application, as suggested above, the instruction may be issued by a user to launch a calculator application.

An embodiment then determines at 303 if the first content is associated with the second content. As described herein, this association may take a variety of forms. For example, the association may be an association made by considering the user's interaction with the first content alone. By way of example, continued focus by a user, e.g., as detected by an eye tracking system of the device in question, may inform the determination that any subsequently launched content (second content in this example) is associated with that first content or the focused on sub part thereof.

As another example, the association may be a predetermined correlation taking into known (predetermined or learned) content types. Thus, multiple windows of a particular application may be predetermined as correlated and thus displayed in a non-overlapping form. Likewise, an application A and another application B may be predetermined as correlated and thus content of these applications may be displayed in a non-overlapping form.

If there is not an association determined at 303, a default operation may be executed at 304. For example, the second content may simply be displayed in its default position, such as in the last position content of that type was displayed (e.g., launching a calculator application in its last displayed position).

However, if there is a determination at 303 that the first and second contents are associated, an embodiment may provide content positioning data based on the association at 305. In this non-limiting example, an embodiment may determine that the user is currently reading a part of the email displayed as the first content using eye tracking technology and thus make a correlation between that area of the display and an area of the display in which the calculator application (second content in this example) would be displayed by default. In this case, for example, an embodiment may determine that the calculator application is set to display over the email application, thus forming an association at 303.

An embodiment may provide positioning data that updates the display location of the email application (first content), the calculator application (second content), or both. By way of example, if an embodiment determines at 303 that the calculator application is set to display over the part of the email application content viewed by the user, an embodiment may provide updated positioning data for the calculator application on this basis at 305.

As has been described herein, this may include repositioning the calculator application, resizing it, making it (in part or in total) semi-transparent or transparent, or a combination of the foregoing. This helps to ensure that an embodiment may display, at 306, both the first content and the second content in an intelligent fashion such that both (or important parts of one or both) remain viewable.

An embodiment may access data identifying correlated applications form a variety of locations in order to determine that the first content and the second content are associated with correlated applications. As an example, predetermined lists of correlated applications may be accessed to assist in this determination. Likewise, correlations may be dynamically determined, e.g., from user a user's current usage, such as derived from eye tracking or other user input or derived data, from underlying data regarding the content currently displayed (e.g., document fields, document metadata, application metadata, etc.), from a user's past history of application or content usage, etc.

By way of example, eye tracking data may be accessed from an eye tracking sub-system of a device, such as a laptop equipped with a camera and appropriate gaze tracking software. In this case, the determining of a correlation or association between the first content type and the second content type may be based on the eye tracking data of the current use context. Similarly, if a user is known to frequently switch between application types in a viewing session, and the first content and the second content are derived from these applications, an embodiment may determine that the first content and the second content are associated with correlated applications based on the application usage data.

It is worth noting that the determination of an association or correlation may be made at a variety of times. In one example, it may be made each time a user attempts to launch second content (i.e., undertakes an action to initiate a multi-windowed viewing experience). Therefore, the determination may be made prior to actual display of the second content. In contrast, an embodiment may first display the second content in a default position and thereafter reposition it.

The positioning of one or more of the first content and the second content within the display device according to the positioning data may be accomplished in a variety of ways. For example, the positioning may include positioning the second content in a non-overlapping area of the display device with respect to a display area including a portion of the first content. This may correspond to identifying that the first content includes a predetermined area, e.g., a text input field that should generally not be overlaid by the second content. Likewise, the portion of the first content may be a dynamically determined area, e.g., based on eye tracking data.

In a similar fashion, repositioning may be complimented or replaced by resizing. Likewise, if repositioning and/or resizing is not appropriate (e.g., there is not enough screen space, etc.), transparent or semi-transparent display views may be implemented.

It will thus be understood that an embodiment generally provides a more intelligent way to position displayed data by default. In many cases this should completely relieve the user of having to reposition displayed content manually or interface with complex split display settings.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages or machine code. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
outputting, to a display device, first content in a first location on the display device;
receiving, using a processor, an instruction to output second content to the display device, wherein the second content is not co-displayed with the first content prior to the instruction;
said second content having a predetermined location for display set by an operating system;
determining, using a processor, that the predetermined location for display of the second content on the display is occupied at least partially by the first content;
detecting, using a processor, that the first content and the second content have a relation to one another;
in response to the detecting, altering, using a processor, one or more of the predetermined location for display of the second content and the first location on the display of the first content; and
displaying both of the first content and the second content on the display device in a non-overlapping display.

2. The method of claim 1, wherein applications having a relation are predetermined.

3. The method of claim 1, wherein applications having a relation are dynamically determined.

4. The method of claim 1, further comprising accessing eye tracking data;
wherein the altering comprises first determining that the first content and the second content are related based on the eye tracking data.

5. The method of claim 1, further comprising accessing application usage data;
wherein the altering comprises first determining that the first content and the second content are related based on the application usage data.

6. The method of claim 1, wherein the altering comprises positioning the second content in a non-overlapping area of the display device with respect to a display area including a portion of the first content.

7. The method of claim 6, wherein the portion of the first content comprises a predetermined area.

8. The method of claim 6, wherein the portion of the first content comprises a dynamically determined area.

9. The method of claim 8, further comprising accessing eye tracking data;
wherein the dynamically determined area is determined based on the eye tracking data.

10. An apparatus, comprising:
a display device;
an input device;
a processor; and
a memory that stores instructions executable by the processor to:
output, to the display device, first content in a first location on the display device;
receive an instruction to output second content to the display device, wherein the second content is not co-displayed with the first content prior to the instruction;
said second content having a predetermined location for display set by an operating system;
determine that the predetermined location for display of the second content on the display is occupied at least partially by the first content;
detect, using a processor, that the first content and the second content have a relation to one another;
in response to detecting that the first content and the second content have a relation to one another, alter one or more of the predetermined location for display of the second content and the first location on the display of the first content; and
display both of the first content and the second content on the display device in a non-overlapping display.

11. The apparatus of claim 10, wherein applications having a relation are predetermined.

12. The apparatus of claim 10, wherein applications having a relation are dynamically determined.

13. The apparatus of claim 10, wherein the instructions are further executable by the processor to access eye tracking data;
wherein to alter comprises first determining that the first content and the second content are related based on the eye tracking data.

14. The apparatus of claim 10, wherein the instructions are further executable by the processor to access application usage data;
wherein to alter comprises first determining that the first content and the second content are related based on the application usage data.

15. The apparatus of claim 10, wherein to alter comprises positioning the second content in a non-overlapping area of the display device with respect to a display area including a portion of the first content.

16. The apparatus of claim 15, wherein the portion of the first content comprises a predetermined area.

17. The apparatus of claim 15, wherein the portion of the first content comprises a dynamically determined area.

18. A product, comprising:
a computer readable storage device having code embodied therewith, the code being executable by a processor and comprising:
code that outputs, to a display device, first content in a first location on the display device;
code that receives, using a processor, an instruction to output second content to the display device, wherein the second content is not co-displayed with the first content prior to the instruction;
said second content having a predetermined location for display set by an operating system;
code that determines, using a processor, that the predetermined location for display of the second content on the display is occupied at least partially by the first content;
code that detects, using a processor, that the first content and the second content have a relation to one another;
code that alters, in response to output of the code that detects, using a processor, one or more of the predetermined location for display of the second content and the first location on the display of the first content; and
code that displays both of the first content and the second content on the display device in a non-overlapping display.

* * * * *